(12) United States Patent
Anderson

(10) Patent No.: US 7,667,468 B1
(45) Date of Patent: Feb. 23, 2010

(54) CAPACITIVE SENSOR WITH RATIOMETRIC VOLTAGE REFERENCES

(75) Inventor: Erik Anderson, Shoreline, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 257 days.

(21) Appl. No.: 11/880,963

(22) Filed: Jul. 24, 2007

(51) Int. Cl.
*G01R 27/26* (2006.01)

(52) U.S. Cl. .................. 324/676; 324/678; 324/679

(58) Field of Classification Search ........... 324/676, 324/678, 679; 341/143
See application file for complete search history.

(56) References Cited

U.S. PATENT DOCUMENTS

| | | | | |
|---|---|---|---|---|
| 4,716,361 A | * | 12/1987 | Sheffer | 324/679 |
| 5,461,321 A | * | 10/1995 | Sanders et al. | 324/678 |
| 6,362,632 B1 | * | 3/2002 | Livingston | 324/678 |
| 7,145,350 B2 | * | 12/2006 | Mellert et al. | 324/678 |
| 7,235,983 B2 | * | 6/2007 | O'Dowd et al. | 324/679 |
| 7,304,483 B2 | * | 12/2007 | O'Dowd et al. | 324/679 |

* cited by examiner

*Primary Examiner*—Timothy J Dole

(57) ABSTRACT

A capacitive sensor with ratiometric voltage references includes a voltage source, a charge transfer switch, an integrating capacitor, and a comparator. The voltage source is configured to generate a first voltage reference and a second voltage reference in response to a supply voltage, where the first voltage reference changes proportionally to the second voltage reference in response to a change in the supply voltage. The charge transfer switch is coupled to the integrating capacitor to distribute charge between a sensing capacitor and the integrating capacitor, where the charge is accumulated in response to the first voltage reference. The comparator is coupled to the second voltage reference and the integrating capacitor to compare a voltage on the integrating capacitor against the second voltage reference.

21 Claims, 8 Drawing Sheets

CAPACITIVE SENSOR WITH RATIOMETRIC VOLTAGE REFERENCES

TECHNICAL FIELD

This disclosure relates generally to electronic circuits, and in particular but not exclusively, relates to capacitive sensor circuits.

BACKGROUND INFORMATION

Capacitance sensors are used to implement a variety of useful functions including touch sensors (e.g., touch pad, touch dial, touch wheel, etc.), determining the presence of an object, accelerometers, and other functions. In general, capacitive sensors are intended to replace mechanical buttons, knobs, and other similar mechanical user interface controls. A capacitive sensor permits eliminating complicated mechanical switches and buttons, providing reliable operation under harsh conditions. Capacitive sensors are widely used in the modern consumer applications, providing new user interface options in existing products (cell phones, digital music players, personal digital assistances, etc.).

One class of capacitive sensor uses a charge transfer technique to sense the capacitance of a sensing capacitor. In one example, the sensing capacitor is first charged using a supply voltage. The charge accumulated on the sensing capacitor is then transferred to an integrating capacitor. The stages of charging the sensing capacitor and transferring the charge to an integrating capacitor are performed repeatedly in response to a first clock source such that a voltage on the integrating capacitor ramps upwards with respect to time. The voltage on the integrating capacitor is then compared to a predetermined reference voltage. The time that it takes the voltage on the integrating capacitor to exceed the reference voltage is related to the capacitance of the sensing capacitor. Thus, the capacitive sensor may also include a second clock source and additional circuitry to measure the amount of time that it takes the voltage on the integrating capacitor to exceed the reference voltage. This measured time may then be used to determine the capacitance of the sensing capacitor.

The above-described capacitance sensor functions properly if the supply voltage and reference voltage do not change. However, changes in temperature or humidity of the capacitance sensor and/or supporting circuitry will often cause one or more of the supply voltages and/or reference voltages to drift. Also, changes in line voltage may cause the supply voltage to change (e.g. voltage spike, externally coupled noise, etc.).

A change in the supply voltage will cause the voltage on the integrating capacitor to charge faster or slower depending on the change in the supply voltage. A change in the reference voltage will cause the voltage on the integrating capacitor to exceed this reference either earlier or later due to the changed reference. Either way, the measured amount of time that it takes the voltage on the integrating capacitor to exceed the reference voltage will change in response to a change in the supply and/or reference voltage resulting in inaccuracies of the measured capacitance.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for a capacitive sensor with ratiometric voltage references are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Ratiometric" is defined herein as the characteristic of one value as changing by a corresponding percentage to a change in another value. For example, if one value is doubled then a ratiometric second value is also doubled.

Figure 1A:
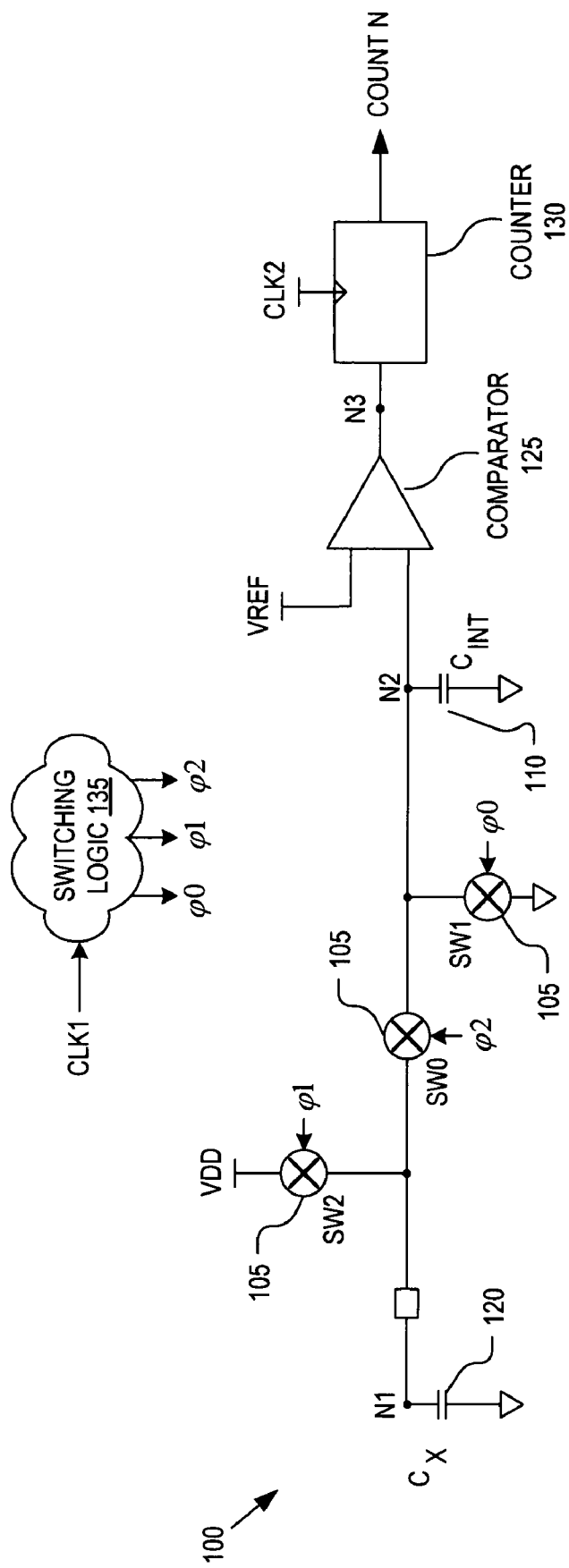
FIG. 1A is a circuit diagram illustrating a capacitance measurement circuit.

FIG. 1A is a circuit diagram illustrating a capacitance measurement circuit 100 including three switches 105 with control terminals ($\phi 0$, $\phi 1$, and $\phi 2$), an integrating capacitor 110 having a capacitance $C_{INT}$, a comparator 125, a counter 130, and a switching logic 135. Capacitance sensor 100 may be used to sense changes in capacitance on a sensing capacitor 120 having a changing capacitance $C_X$.

During operation, capacitance sensor 100 operates as follows to sense capacitance changes on sensing capacitor 120. First, integrating capacitor 110 is discharged to a ground potential by asserting control terminal $\phi 2$ to open circuit switch SW0 and by asserting control terminal $\phi 0$ to close circuit switch SW1. Once discharged to ground, integrating capacitor 110 is disconnected from ground by asserting φ0 to open switch SW1. Then, sensing capacitor 120 is charged to the supply voltage VDD by asserting φ2 to open circuit switch SW0 and asserting φ1 to close circuit switch SW2. Once sensing capacitor 120 charges to the supply voltage VDD, the charge on sensing capacitor 120 is transferred onto integrating capacitor 110 and distributed between the two capacitors. Charge transfer occurs by asserting φ0 and φ1 to open circuit switches SW1 and SW2, respectively, and asserting φ2 to close circuit switch SW0.

Figure 1B:
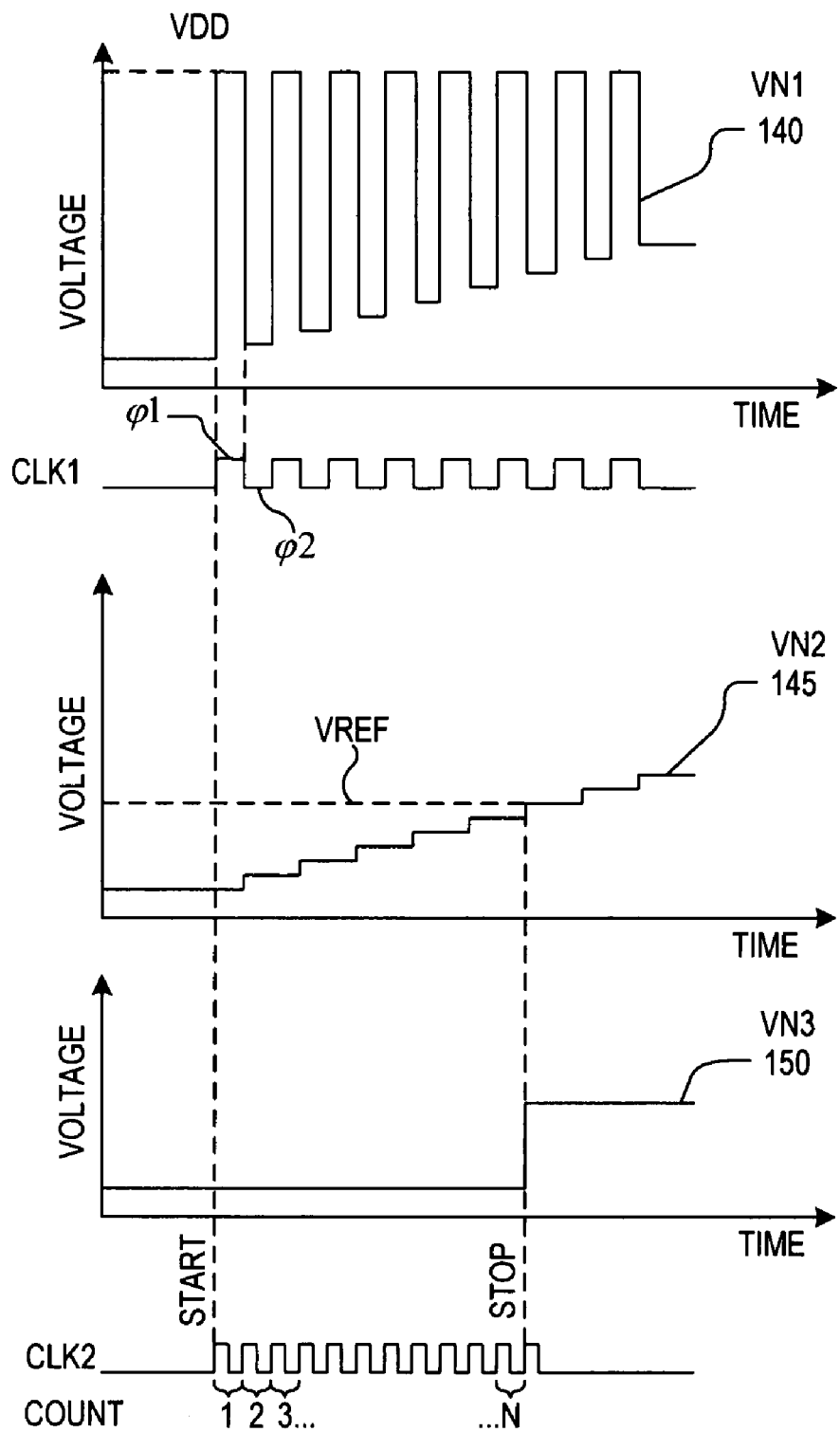
FIG. 1B is a timing diagram illustrating operation of a capacitance measurement circuit.

The above stages of charging sensing capacitor 120 and transferring the charge onto integrating capacitor 110 are controlled by switching logic 135 and are in response to a first clock signal CLK1. For example, as illustrated in FIG. 1B, switching logic 135 may be configured to assert φ1 and φ2 to close switch SW2 and open SW0 during one portion of the first clock signal CLK1 and may assert φ1 and φ2 to open switch SW2 and close SW0 during another portion of the first clock signal CLK1. As the periods of charging and transferring are repeated the voltages of nodes N1 and N2 ramp with time as illustrated by line graphs 140 and 145.

Once the voltage at node N2 exceeds reference voltage VREF, the output of comparator 125 changes states. For example, line graph 150 shows the voltage on node N3 as changing from a low voltage to a high voltage once the voltage on node N2 (i.e., line graph 145) exceeds reference voltage VREF.

Counter 130 is coupled to receive the output of comparator 125 and also a second clock signal CLK2. As illustrated in FIGS. 1A and 1B, counter 130 is configured to count the number N of clock cycles of the second clock signal CLK2, starting at the beginning of the charge/transfer cycle and stopping once the output of comparator 130 changes states. The number N of clock cycles counted by counter 130 is representative of the capacitance $C_X$ of sensing capacitor 120. In one example, count N may be represented by the following relationship:

$$N = \frac{T_{CLK1}}{T_{CLK2}} \cdot \frac{C_{INT}}{C_X} \cdot \ln\left(1 - \frac{V_{REF}}{V_{DD}}\right), \quad \text{(relation 1)}$$

where $T_{CLK1}$ is the time for one period of the first clock signal CLK1, and $T_{CLK2}$ is the time for one period of the second clock signal CLK2.

However, VDD and VREF of FIGS. 1A and 1B are not ratiometric. That is, VDD may drift up or down without a change in VREF, VREF may drift up or down without a change in VDD, or VDD and VREF may both drift up or down, each by a different percentage. Thus, as VDD drifts up or down, the time it takes the voltage on node N2 to exceed VREF changes. Also, as VREF drifts up or down, the time at which the output of comparator 125 changes states will also change. In either case, with VDD being non-ratiometric to VREF, the count N may translate to an inaccurate representation of capacitance $C_X$.

Accordingly, embodiments of the present invention are disclosed which provide a capacitive sensor with ratiometric voltage references. In one embodiment, a capacitive sensor includes a voltage source that generates a first voltage reference and a second voltage reference in response to a supply voltage. As the supply voltage changes (e.g., due to change temperature, change in humidity, voltage spike, externally coupled noise, etc.), the first voltage reference changes proportionally to the second voltage reference, thereby providing increased accuracy in capacitance measurements. These and other embodiments are described in detail below.

Figure 2A:
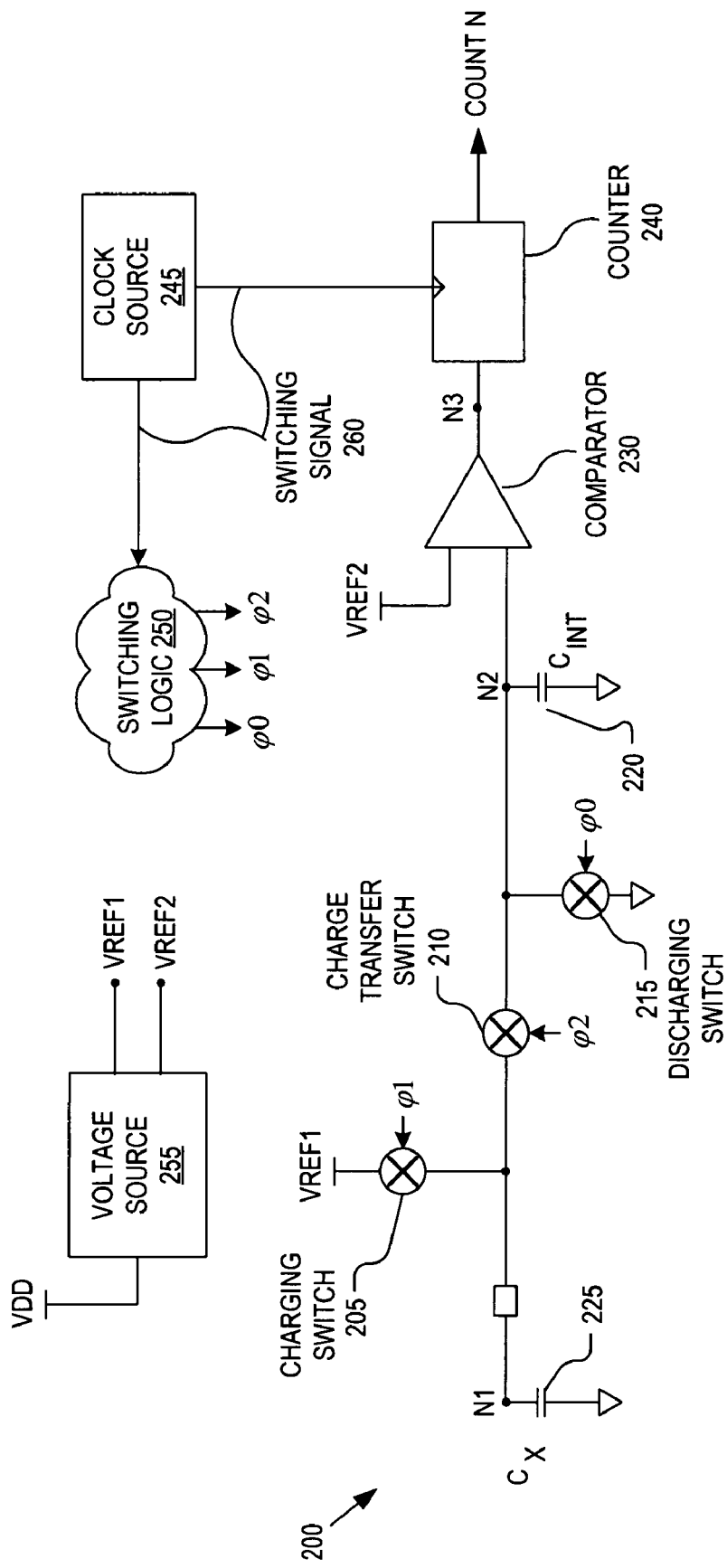
FIG. 2A is a circuit diagram illustrating a capacitance measurement circuit, in accordance with an embodiment of the invention.

FIG. 2A is a circuit diagram illustrating a capacitance measurement circuit 200, in accordance with an embodiment of the invention. The illustrated embodiment of circuit 200 includes a charging switch 205, a charge transfer switch 210, a discharging switch 215, an integrating capacitor 220 having a capacitance $C_{INT}$, a sensing capacitor 225 having a changing capacitance $C_X$, a comparator 230, a counter 240, a clock source 245, a switching logic 250, and a voltage source 255 having ratiometric voltage references VREF1 and VREF2.

Figure 2B:
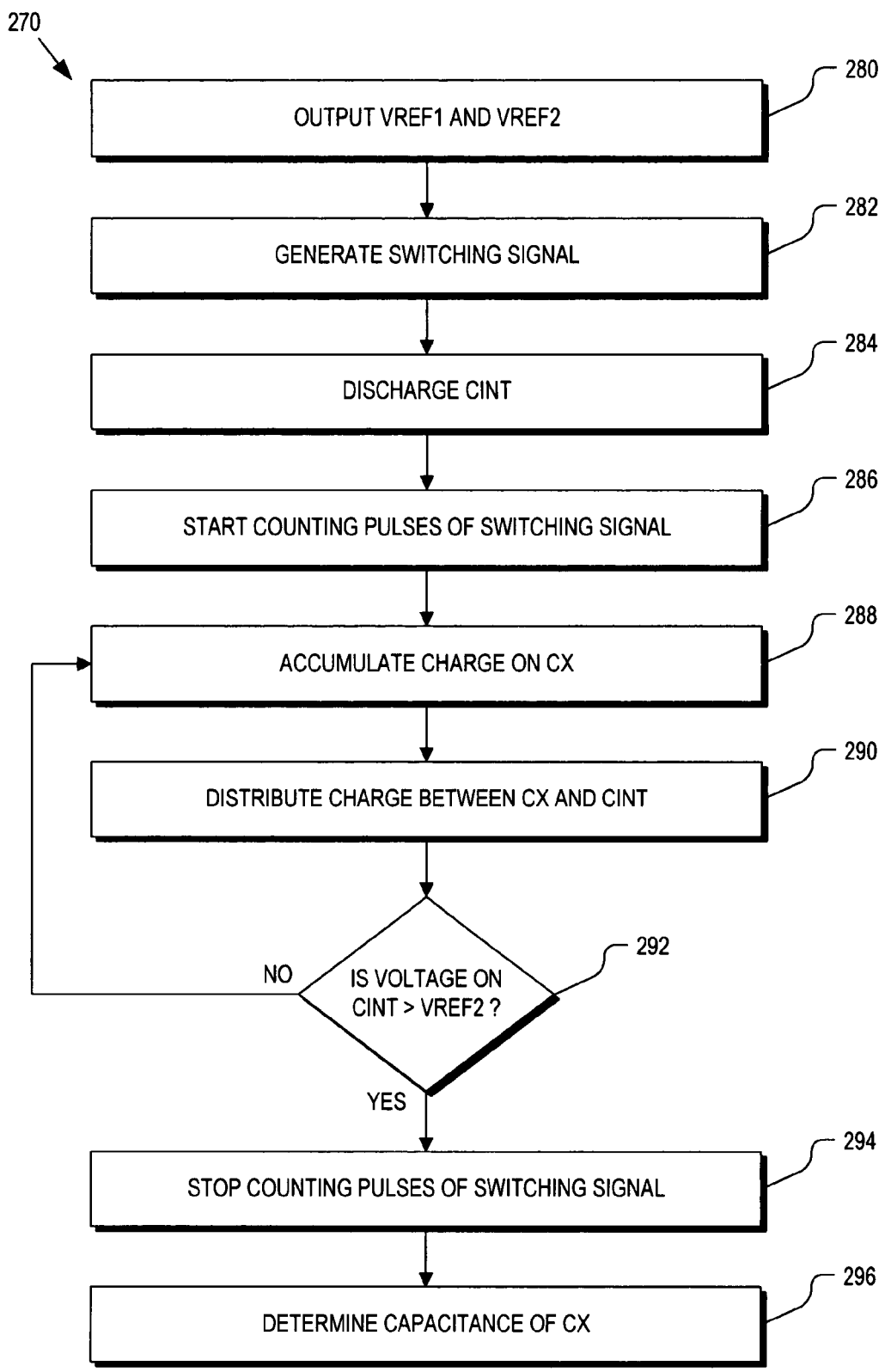
FIG. 2B is a flow chart illustrating a process of operating a capacitance measurement circuit, in accordance with an embodiment of the invention.

FIG. 2B is a flow chart illustrating a process 270 of operating capacitance measurement circuit 200. Operation of capacitance measurement circuit 200 is described with reference to FIGS. 2A and 2B. Process 270 may begin at a process block 280 where voltage source 255 outputs VREF1 and VREF2 in response to a supply voltage, such as VDD. Next, in a process block 282, clock source 245 generates switching signal 260. Integrating capacitor 220 is then discharged to a ground potential by asserting control terminal φ2 to open circuit charge transfer switch 210 and by asserting control terminal φ0 to close circuit discharging switch 215 (e.g., process block 284). Once discharged to ground, counter 240 may begin counting pulses of switching signal 260 at a process block 286.

Next, in a process block 288, integrating capacitor 220 is disconnected from ground by asserting φ0 to open discharging switch 215. Then, charge is accumulated on sensing capacitor 225 by asserting φ2 to open circuit charge transfer switch 210 and asserting φ1 to close circuit charging switch 205. Once sensing capacitor 225 charges to the first voltage reference VREF1, the charge on sensing capacitor 225 is then transferred onto integrating capacitor 220 and distributed between the two capacitors (e.g., process block 290). Charge transfer occurs by asserting φ0 and φ1 to open circuit discharging switch 215 and charging switch 205, respectively, and asserting φ2 to close circuit charge transfer switch 210.

The above stages of charging sensing capacitor 225 and transferring the charge onto integrating capacitor 220 are controlled by switching logic 250 and are in response to a switching signal 260 generated by clock source 245. For example, switching logic 250 may be configured to assert φ1 and φ2 to close charging switch 205 and open charge transfer switch 210 during one portion of switching signal 260 and may assert φ1 and φ2 to open charging switch 205 and close charge transfer switch 210 during another portion of switching signal 260. As the periods of charging and transferring are repeated, the voltages of nodes N1 and N2 ramp higher with time.

In a process block 292, the voltage of node N2 is compared with second voltage reference VREF2. If the voltage at node N2 exceeds second reference voltage VREF2, then the output of comparator 230 changes states. For example, the voltage on node N3 may change from a low voltage to a high voltage once the voltage on node N2 exceeds second reference voltage VREF2. Otherwise, process 270 repeats process blocks 288 and 290 of accumulating and distributing charge.

Counter 240 is coupled to receive the output of comparator 230 and also switching signal 260. Counter 240 is configured to count the number N of clock cycles of switching signal 260, starting at the beginning of the charge/transfer cycle in process block 286 and stopping once the output of comparator 230 changes states in a process block 294. The number N of clock cycles counted by counter 240 is representative of the capacitance $C_X$ of sensing capacitor 225. Thus, in a process block 296, the capacitance $C_X$ of sensing capacitor 225 may be determined in response to the number N of clock cycles counted by counter 240.

As mentioned above, voltage source 255 outputs ratiometric first and second voltage references, VREF1 and VREF2, respectively. In one example, first and second voltage references VREF1 and VREF2 change proportionally to one another. Stated another way, a ratio of VREF1 to VREF2 remains substantially constant throughout operation of capacitance sensor 200. A proportional change in the ratiometric voltage references VREF1 and VREF2 may be caused by a drift in supply voltages, a voltage drop or spike in supply voltages, externally coupled noise, or may be caused by a change in temperature or humidity of voltage source 255.

In one example, count N of capacitive sensor 200 may be represented by relation 1 given above. However, since switching signal 260 is used for both switching logic 250 and for counter 240, the first term of $$\frac{T_{CLK1}}{T_{CLK2}}$$

drops out. Also, since the ratio of VREF2 to VREF1 is constant, the term $$1 - \frac{VREF}{VDD}$$

may be replaced by a constant. Thus, count N of capacitive sensor 200 may be represented by the following simplified relationship:

$$N = \frac{C_{INT}}{C_X} \cdot \ln(k), \quad \text{(relation 2)}$$

where k is a constant defined, at least in part, by $$1 - \frac{VREF2}{VREF1}.$$

Figure 3:
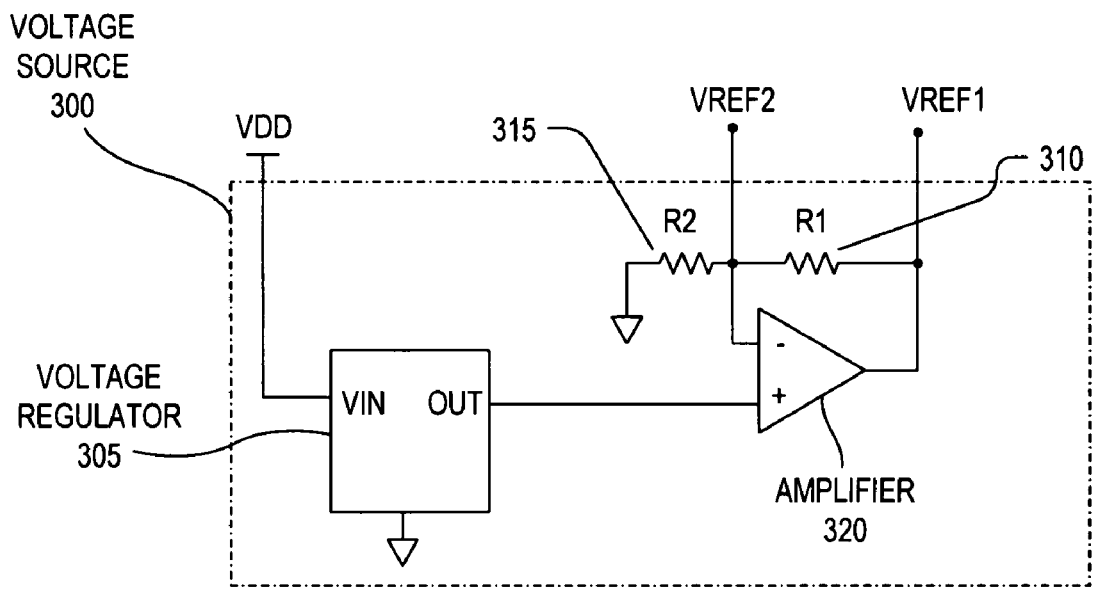
FIG. 3 is a circuit diagram illustrating a voltage source, in accordance with an embodiment of the invention.

FIG. 3 is a circuit diagram illustrating a voltage source 300, in accordance with an embodiment of the invention. Voltage source 300 represents one possible implementation of voltage source 255. The illustrated embodiment of voltage source 300 includes a voltage regulator 305, a first resistor 310, a second resistor 315, and an amplifier 320.

In the illustrated embodiment, voltage regulator 305 is coupled to a voltage rail (i.e., supply voltage), such as VDD. Voltage regulator 305 also provides a regulated output voltage via an OUT terminal. In one example, voltage regulator 305 may be a 3-terminal adjustable voltage regulator, such as an LM317, where an ADJ terminal of the LM317 is coupled to a voltage rail, such as a common reference or ground. As shown in FIG. 3, resistor 310 is coupled between an input (e.g., non-inverting) and an output of amplifier 320. Resistor 315 is coupled between an input (e.g., non-inverting) and another voltage rail, such as a common reference or ground. In one example, a ratio of a resistance of resistor 310 to a resistance of resistor 315 remains nearly constant in response to changes in temperature of both resistors. In one example, resistor 310 and resistor 315 have substantially the same temperature coefficients, such that the resistance of each resistor changes proportionally to one another in response to a change in temperature. Although FIG. 3 illustrates resistor 310 and resistor 315 as discrete electrical components, these resistors may also be implemented through use of switched capacitors, transistors, or other known methods of resisting electrical current.

Figure 4:
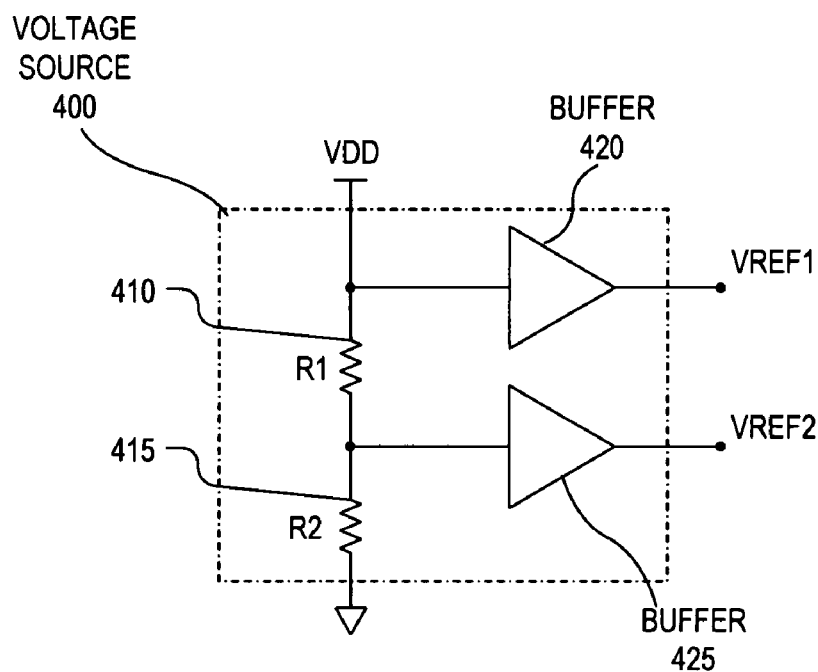
FIG. 4 is a circuit diagram illustrating a voltage source, in accordance with an embodiment of the invention.

FIG. 4 is a circuit diagram illustrating a voltage source 400, in accordance with an embodiment of the invention. Voltage source 400 represents one possible implementation of voltage source 255. The illustrated embodiment of voltage source 400 includes a first resistor 410, a second resistor 415, and voltage buffers 420 and 425.

In the illustrated embodiment, resistor 410 and resistor 415 are coupled in series between voltage rails (e.g., between VDD and a common reference). Also, shown in the illustrated embodiment, voltage buffer 420 is coupled to one terminal of resistor 410 to buffer the first voltage reference VREF1. Voltage buffer 425 is coupled to another terminal of resistor 410 to buffer the second voltage reference VREF2. In one example, voltage buffers 420 and 425 are operational amplifiers configured to operate as voltage followers. For example, voltage buffer 420 may include an operational amplifier having a positive input terminal coupled to resistor 410 and a negative input terminal coupled to an output terminal of the operational amplifier.

In one example, a ratio of a resistance of resistor 410 to a resistance of resistor 415 remains nearly constant in response to changes in temperature of both resistors. In one example, resistor 410 and resistor 415 have substantially the same temperature coefficients, such that the resistance of each resistor changes proportionally to one another in response to a change in temperature. Although FIG. 4 illustrates resistor 410 and resistor 415 as discrete electrical components, these resistors may also be implemented through use of a switched capacitor, a transistor, or other known methods of resisting electrical current.

Figure 5A:
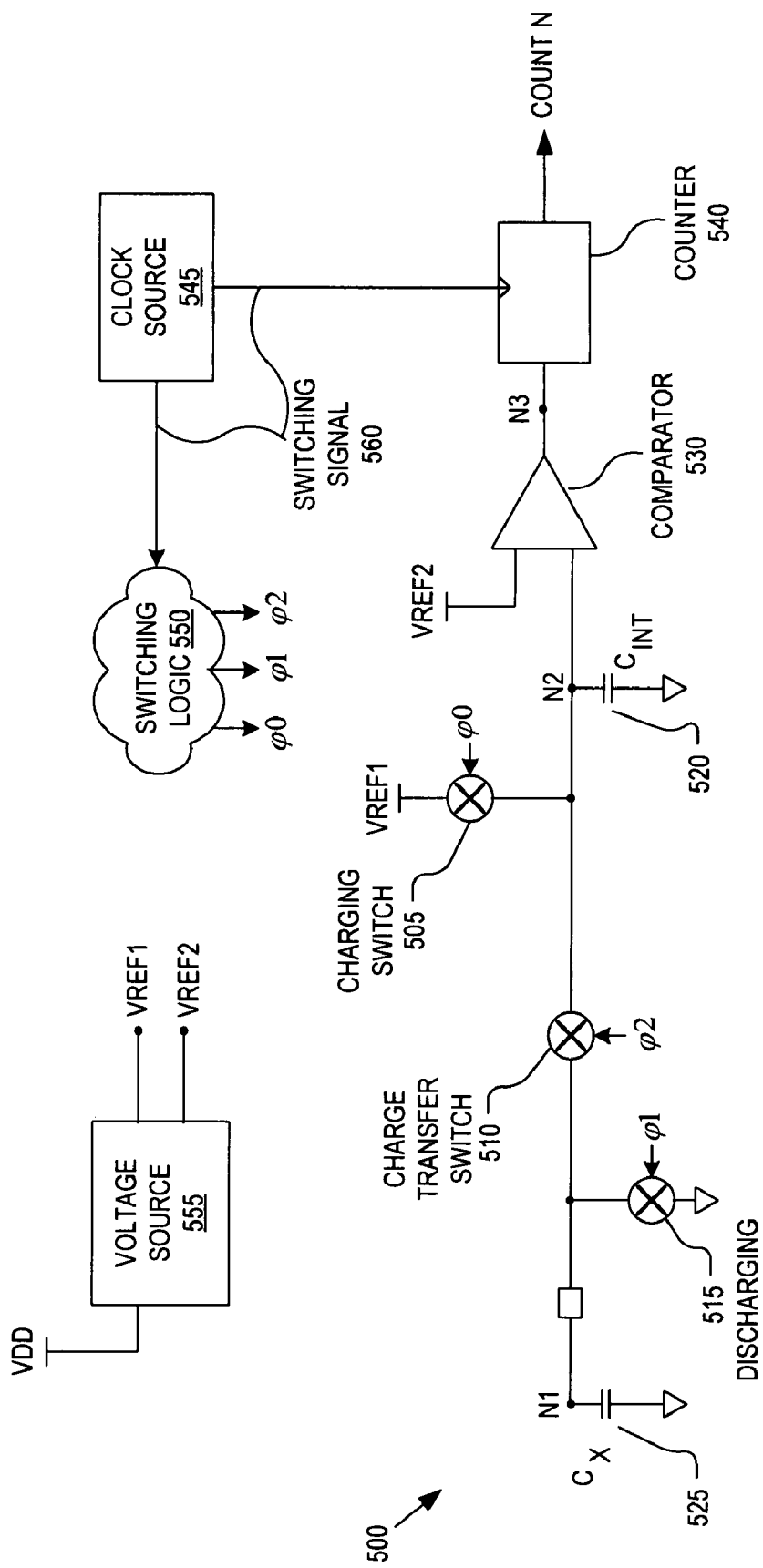
FIG. 5A is a circuit diagram illustrating a capacitance measurement circuit, in accordance with an embodiment of the invention.

FIG. 5A is a circuit diagram illustrating a capacitance measurement circuit 500, in accordance with an embodiment of the invention. The illustrated embodiment of circuit 500 includes a charging switch 505, a charge transfer switch 510, a discharging switch 515, an integrating capacitor 520 having a capacitance $C_{INT}$, a sensing capacitor 525 having a changing capacitance $C_X$, a comparator 530, a counter 540, a clock source 545, a switching logic 550, and a voltage source 555 having ratiometric voltage references VREF1 and VREF2. In one example, voltage source 555 includes an implementation of voltage source 300 or voltage source 400.

Figure 5B:
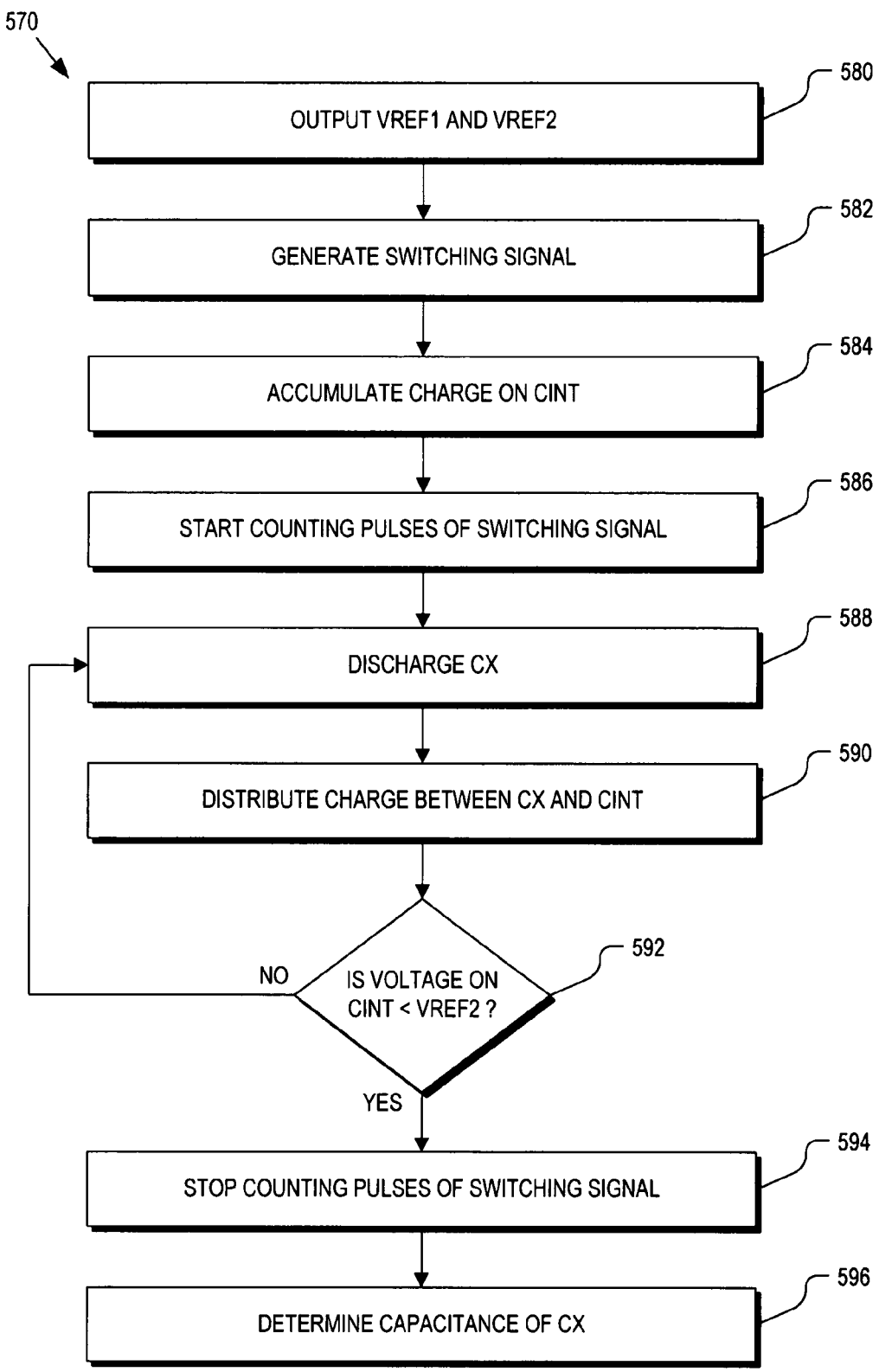
FIG. 5B is a flow chart illustrating a process of operating a capacitance measurement circuit, in accordance with an embodiment of the invention.

FIG. 5B is a flow chart illustrating a process 570 of operating capacitance measurement circuit 500. Operation of capacitance measurement circuit 500 is described with reference to FIGS. 5A and 5B. Process 570 may begin at a process block 580 where voltage source 555 outputs VREF1 and VREF2 in response to a supply voltage such as VDD. Next, in a process block 582, clock source 545 generates switching signal 560. Charge is then accumulated on integrating capacitor 520 (e.g., process block 584) by asserting control terminal φ2 to open circuit charge transfer switch 510 and by asserting control terminal φ0 to close circuit charging switch 505. Once integrating capacitor 520 is charged to the first voltage reference, counter 540 may begin counting pulses of switching signal 560 at a process block 586.

Next, in a process block 588, integrating capacitor 520 is disconnected from the first voltage reference by asserting φ0 to open charging switch 505. Then, sensing capacitor 525 is discharged to ground by asserting φ2 to open circuit charge transfer switch 510 and asserting φ1 to close circuit discharging switch 515. Once sensing capacitor 525 discharges to ground, a portion of the charge on integrating capacitor 520 is transferred onto sensing capacitor 525 and distributed between the two capacitors (e.g., process block 590). Charge transfer occurs by asserting φ0 and φ1 to open circuit charging switch 505 and discharging switch 515, respectively, and asserting φ2 to close circuit charge transfer switch 510.

The above stages of discharging sensing capacitor 525 and transferring the charge onto sensing capacitor 525 are controlled by switching logic 550 and are in response to a switching signal 560 generated by clock source 545. For example, switching logic 550 may be configured to assert φ1 and φ2 to close discharging switch 515 and open charge transfer switch 510 during one portion of switching signal 560 and may assert φ1 and φ2 to open discharging switch 515 and close charge transfer switch 510 during another portion of switching signal 560. As the periods of discharging and transferring are repeated the voltages of nodes N1 and N2 ramp lower with time.

In a process block 592, the voltage of node N2 is compared with second voltage reference VREF2. If the voltage at node N2 is lower than second reference voltage VREF2, then the output of comparator 530 changes states. For example, the voltage on node N3 may change from a low voltage to a high voltage once the voltage on node N2 is less than the second reference voltage VREF2. Otherwise, process 570 repeats process blocks 588 and 590 of discharging and distributing charge.

Counter 540 is coupled to receive the output of comparator 530 and also switching signal 560. Counter 540 is configured to count the number N of clock cycles of switching signal 560, starting at the beginning of the charge/transfer cycle in process block 586 and stopping once the output of comparator 530 changes states in a process block 594. The number N of clock cycles counted by counter 540 is representative of the capacitance $C_X$ of sensing capacitor 525. Thus, in a process block 596, the capacitance $C_X$ of sensing capacitor 525 may be determined in response to the number N of clock cycles counted by counter 540.

Figure 6:
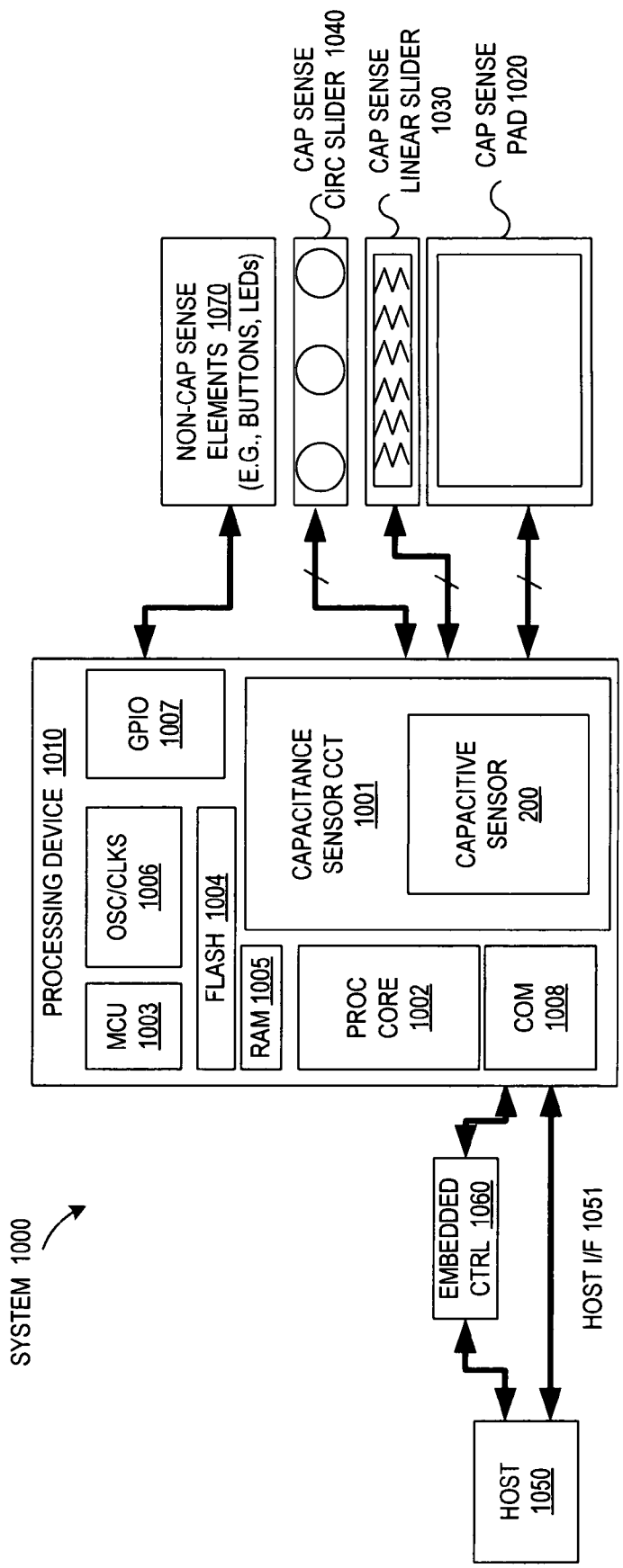
FIG. 6 is a functional block diagram illustrating a demonstrative processing system for implementing a capacitive sense user interface, in accordance with an embodiment of the invention.

FIG. 6 is a functional block diagram illustrating a demonstrative system 1000 for implementing a capacitance sense user interface, in accordance with an embodiment of the invention. The illustrated embodiment of system 1000 includes a processing device 1010, a capacitive sense pad 1020, a capacitive sense linear slider 1030, a capacitive sense radial slider 1040, a host processor 1050, an embedded controller 1060, and non-capacitance sensor elements 1070. Processing device 1010 may include analog and/or digital general purpose input/output ("GPIO") ports 1007. GPIO ports 1007 may be programmable. GPIO ports 1007 may be coupled to a Programmable Interconnect and Logic ("PIL"), which acts as an interconnect between GPIO ports 1007 and a digital block array of processing device 1010 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 1010 may also include memory, such as random access memory (RAM) 1005 and program flash 1004. RAM 1005 may be static RAM ("SRAM"), and program flash 1004 may be a non-volatile storage, which may be used to store firmware. Processing device 1010 may also include a memory controller unit ("MCU") 1003 coupled to memory and the processing core 1002.

Processing device 1010 may also include an analog block array (not illustrated). The analog block array is also coupled to the system bus. The analog block array also may be configured to implement a variety of analog circuits (e.g., ADC, analog filters, etc.) using, in one embodiment, configurable UMs. The analog block array may also be coupled to the GPIO 1007.

As illustrated, capacitance sensor circuit 1001, which includes an implementation of capacitive sensor 200 or 500, may be integrated into processing device 1010. Capacitance sensor circuit 1001 may include analog I/O for coupling to an external component, such as capacitive sense pad 1020, capacitive sense linear slider 1030, capacitive sense radial slider 1040, and/or other capacitive sense devices. Note, capacitive sense pad 1020, capacitive sense linear slider 1030, and capacitive sense radial slider 1040 may each include one or more sensing capacitors Cx to implement the individual capacitive sense buttons therein. In operation, processing core 1002 receives a digital signal from capacitance sensor circuit 1001. In one example, this digital signal is the count N output from counters 240 or 540 (shown in FIGS. 2 and 5, respectively). In one embodiment, counters 240 and 540 include hardware registers for storing the count N, which may be read by processing core 1002 during a read request via a system bus. Processing core may then execute instructions to perform a variety of tasks in response to the digital signal received from capacitance sensor circuit 1001. For example, processing core 1002 may calculate the capacitance of one or more of the sensing capacitors. In another example, processing core 1002 determines whether a capacitance of one or more of the sensing capacitors has changed. In yet another example, processing core 1002 calculates a rate of change in the capacitance of one or more of the sensing capacitors.

Processing device 1010 may also include internal oscillator/clocks 1006 and communication block 1008. The oscillator/clocks block 1006 provides clock signals to one or more of the components of processing device 1010. Communication block 1008 may be used to communicate with an external component, such as a host processor 1050, via host interface (I/F) line 1051. Alternatively, processing device 1010 may also be coupled to embedded controller 1060 to communicate with the external components, such as host 1050. Interfacing to the host 1050 can be through various methods. In one exemplary embodiment, interfacing with the host 1050 may be done using a standard PS/2 interface to connect to embedded controller 1060, which in turn sends data to the host 1050 via low pin count (LPC) interface. In some instances, it may be beneficial for processing device 1010 to do both touch-sensor pad and keyboard control operations, thereby freeing up the embedded controller 1060 for other housekeeping functions. In another exemplary embodiment, interfacing may be done using a universal serial bus (USB) interface directly coupled to host 1050 via host interface line 1051. Alternatively, processing device 1010 may communicate to external components, such as host 1050 using industry standard interfaces, such as USB, PS/2, inter-integrated circuit (12C) bus, or system packet interfaces (SPI). Host 1050 and/or embedded controller 1060 may be coupled to processing device 1010 with a ribbon or flex cable from an assembly, which houses the sensing device and processing device.

In one embodiment, processing device 1010 is configured to communicate with embedded controller 1060 or host 1050 to send and/or receive data. The data may be a command or alternatively a signal. In an exemplary embodiment, system 1000 may operate in both standard-mouse compatible and enhanced modes. The standard-mouse compatible mode utilizes the HID class drivers already built into the Operating System (OS) software of host 1050. These drivers enable processing device 1110 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, processing device 1010 may be configured to communicate with embedded controller 1060 or host 1050, using non-OS drivers, such as dedicated touch-sensor pad drivers, or other drivers known by those of ordinary skill in the art.

Processing device 1010 may reside on a common carrier substrate such as, for example, an integrated circuit (IC) die substrate, a multi-chip module substrate, or the like. Alternatively, the components of processing device 1010 may be one or more separate integrated circuits and/or discrete components. In one exemplary embodiment, processing device 1010 may be a Programmable System on a Chip (PSoC™) processing device, manufactured by Cypress Semiconductor Corporation, San Jose, Calif. Alternatively, processing device 1010 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like. In an alternative embodiment, for example, processing device 1110 may be a network processor having multiple processors including a core unit and multiple microengines. Additionally, processing device 1010 may include any combination of general-purpose processing device(s) and special-purpose processing device(s).

Capacitance sensor 1001 may be integrated into the IC of processing device 1010, or alternatively, in a separate IC. Descriptions of capacitance sensor 1001 may be generated and compiled for incorporation into other integrated circuits. For example, behavioral level code describing capacitance sensor 1001, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1001.

In one embodiment, electronic system 1000 may be used in a notebook computer. Alternatively, system 1000 may be used in other applications, such as a mobile handset, a personal data assistant (PDA), a keyboard, a television, a remote control, a monitor, a handheld multi-media device, a handheld video player, a handheld gaming device, or a control panel.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (e.g., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
    a voltage source to generate a first voltage reference and a second voltage reference in response to a supply voltage;
    a charge transfer switch coupled to an integrating capacitor having a first plate and a second plate coupled to a reference voltage rail to distribute charge between a sensing capacitor and the integrating capacitor, the charge accumulated in response to the first voltage reference;
    a control switch coupled to the first plate of the integrating capacitor to selectively disconnect the first plate of the integrating capacitor from a reference voltage node to maintain an integrated charge on the integrating capacitor; and
    a comparator coupled to the second voltage reference and the integrating capacitor to compare a voltage proportional to the integrated charge on the integrating capacitor against the second voltage reference, wherein the first voltage reference changes proportionally to the second voltage reference in response to a change in the supply voltage.

2. The apparatus of claim 1, further comprising:
    a charging switch coupled between the sensing capacitor and the voltage source to charge the sensing capacitor to the first voltage reference, wherein the reference voltage node is coupled to the reference voltage rail, and the control switch is a discharging switch coupled between the integrating capacitor and the reference voltage node to discharge the integrating capacitor.

3. The apparatus of claim 1, further comprising:
    a discharging switch coupled between the sensing capacitor and a voltage rail to discharge the sensing capacitor, wherein the reference voltage node is coupled to the first voltage reference, and the control switch is a charging switch coupled between the integrating capacitor and the reference voltage node to charge the integrating capacitor to the first voltage reference.

4. The apparatus of claim 1, wherein the voltage source comprises:
    a first resistor having a first terminal and a second terminal, wherein the first terminal is coupled to a first voltage rail; and
    a second resistor coupled between the second terminal of the first resistor and a second voltage rail, wherein the first voltage reference is generated in response to a voltage on the first terminal and the second voltage reference is generated in response to a voltage on the second terminal.

5. The apparatus of claim 4, wherein the voltage source further comprises:
    a first voltage buffer coupled to the first terminal of the first resistor to buffer the first voltage reference; and
    a second voltage buffer coupled to the second terminal to buffer the second voltage reference.

6. The apparatus of claim 1, wherein the first voltage reference changes proportionally to the second voltage reference in response to a change in temperature of the voltage source.

7. The apparatus of claim 1, wherein the voltage source comprises:

an amplifier having a first input terminal, a second input terminal, and an output terminal;

a voltage regulator coupled to the first input terminal of the amplifier, the voltage regulator to generate a substantially constant output voltage in response to a voltage supplied by a first voltage rail;

a first resistor coupled between the second terminal and the output terminal of the amplifier; and a second resistor coupled between the second terminal of the amplifier and a second voltage rail, wherein the first voltage reference is generated in response to a voltage at the output terminal of the amplifier and the second voltage reference is generated in response to a voltage at the second terminal of the amplifier.

8. The apparatus of claim 7, wherein the first resistor has a first resistance and the second resistor has a second resistance, wherein a ratio of the first resistance to the second resistance is substantially constant in response to a change in temperature of the first and second resistors.

9. The apparatus of claim 1, further comprising a clock source to generate a switching signal having a switching frequency, wherein the charge is alternately accumulated and distributed between the sensing capacitor and the integrating capacitor in response to the switching signal and at the switching frequency.

10. The apparatus of claim 9, further comprising a counter coupled to an output of the comparator and coupled to receive the switching signal, wherein the counter is configured to count a number of pulses of the switching signal until the voltage on the integrating capacitor is greater than the second voltage reference.

11. The apparatus of claim 10, further comprising a processor coupled to the counter to receive a number N representative of the number of pulses counted by the counter, wherein the processor is configured to determine a capacitance or a change in capacitance of the sensing capacitor in response to the received number N.

12. The apparatus of claim 9, further comprising a counter coupled to an output of the comparator and coupled to receive the switching signal, wherein the counter is to count a number of pulses of the switching signal until the voltage on the integrating capacitor is less than the second voltage reference.

13. The apparatus of claim 1, further comprising an analog input/output for coupling to a capacitive sense user interface, wherein the sensing capacitor is one of a plurality of sensing capacitors within the capacitive sense user interface.

14. The apparatus of claim 1, wherein the first plate of the integrated capacitor is not directly coupled to a resistor.

15. A method of operating a capacitance sensor, comprising:

outputting a first voltage reference and a second voltage reference from a voltage source in response to a supply voltage;

accumulating a charge in response to the first voltage reference;

distributing the charge between a sensing capacitor and an integrating capacitor;

maintaining an integrated charge on the integrating capacitor after the distributing; and comparing a voltage proportional to the integrated charge on the integrating capacitor with the second voltage reference to determine whether the voltage on the integrating capacitor is greater than or less than the second voltage reference, wherein the first voltage reference changes proportionally to the second voltage reference in response to a change in the supply voltage.

16. The method of claim 15, further comprising switching, at a switching frequency, between accumulating the charge and distributing the charge, wherein accumulating the charge comprises charging the sensing capacitor to the first voltage reference.

17. The method of claim 16, further comprising:

generating a switching signal having the switching frequency, wherein the switching between accumulating and distributing is in response to the switching signal;

counting pulses of the switching signal until the voltage on the integrating capacitor is greater than the second voltage reference; and determining the capacitance of the sensing capacitor in response to a number of pulses of the switching signal that are counted.

18. The method of claim 15, wherein accumulating the charge comprises charging the integrating capacitor to the first voltage reference, the method further comprising switching, at a switching frequency, between distributing charge between the sensing capacitor and the integrating capacitor and discharging the sensing capacitor.

19. The method of claim 18, further comprising:

generating a switching signal having the switching frequency, wherein the switching between accumulating and distributing is in response to the switching signal;

counting pulses of the switching signal until the voltage on the integrating capacitor is less than the second voltage reference; and determining the capacitance of the sensing capacitor in response to a number of pulses of the switching signal that are counted.

20. An apparatus, comprising:

means for generating a first voltage reference and a second voltage reference in response to a supply voltage;

means for accumulating a charge in response to the first voltage reference;

means for distributing the charge between a sensing capacitor and an integrating capacitor;

means for maintaining an integrated charge on the integrating capacitor after distributing; and means for comparing a voltage proportional to the integrated charge on the integrating capacitor with the second voltage reference to determine whether the voltage on the integrating capacitor is greater than or less than the second voltage reference, wherein the first voltage reference changes proportionally to the second voltage reference in response to a change in the supply voltage.

21. The apparatus of claim 20, further comprising:

means for switching, at a switching frequency, between accumulating the charge and distributing the charge, wherein accumulating the charge comprises charging the sensing capacitor to the first voltage reference;

means for counting pulses of the switching signal until the voltage on the integrating capacitor is greater than the second voltage reference; and means for determining the capacitance of the sensing capacitor in response to a number of pulses of the switching signal that are counted.

* * * * *